United States Patent
Paulus et al.

(10) Patent No.: US 12,097,684 B2
(45) Date of Patent: *Sep. 24, 2024

(54) PROCESS FOR PREPARING A LAMINATED GLAZING

(71) Applicant: Pilkington Group Limited, Lancashire (GB)

(72) Inventors: Peter Paulus, Muenster (DE); Joachim Pilz, Oer-Erkenschwick (DE); Neil John Durbin, St Helens (GB)

(73) Assignee: Pilkington Group Limited, Lancashire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,208

(22) Filed: Apr. 19, 2023

(65) Prior Publication Data

US 2023/0249440 A1 Aug. 10, 2023

Related U.S. Application Data

(63) Continuation of application No. 16/480,583, filed as application No. PCT/GB2018/050214 on Jan. 25, 2018, now Pat. No. 11,660,842.

(30) Foreign Application Priority Data

Jan. 25, 2017 (GB) .................................. 1701272

(51) Int. Cl.
*B32B 17/10* (2006.01)
*B32B 27/36* (2006.01)
(Continued)

(52) U.S. Cl.
CPC .. *B32B 17/10816* (2013.01); *B32B 17/10036* (2013.01); *B32B 17/10137* (2013.01);
(Continued)

(58) Field of Classification Search
CPC ......... B32B 37/10; B32B 37/12; B32B 37/26; B32B 2037/264; B32B 2037/266;
(Continued)

(56) References Cited

U.S. PATENT DOCUMENTS 1,923,070 A * 8/1933 Belknap ............ B32B 17/10981
65/41
3,808,077 A 4/1974 Rieser et al.
(Continued)

FOREIGN PATENT DOCUMENTS

DE 102013012648 A1 3/2014
EP 0398759 A2 11/1990
(Continued)

OTHER PUBLICATIONS

International Search Report (PCT/ISA/210) mailed on Apr. 5, 2018, by the European Patent Office as the International Searching Authority for International Application No. PCT/GB050214.
(Continued)

*Primary Examiner* — John L Goff, II
(74) *Attorney, Agent, or Firm* — Buchanan Ingersoll & Rooney PC

(57) ABSTRACT

A process for preparing a laminated glazing comprises providing a first glass sheet formed into a desired shape with a first thickness by a first procedure and providing a second glass sheet formed into a desired shape with a second thickness by a second procedure with an interlayer located therebetween, and laminating together the first and second glass sheets and the interlayer at a temperature and pressure sufficient to adhere the interlayer material to the glass sheets and in which the process further comprises applying a mould which is shaped substantially the same as the first glass sheet, against the second glass sheet, during laminating to adhere the interlayer material to the two glass sheets such (Continued)

that after lamination, the shape of the second glass sheet is substantially the same as the shape of the first glass sheet.

14 Claims, 5 Drawing Sheets

(51) Int. Cl.
  *B32B 37/10* (2006.01)
  *B32B 37/12* (2006.01)
  *B32B 37/26* (2006.01)

(52) U.S. Cl.
  CPC .. *B32B 17/10761* (2013.01); *B32B 17/10889* (2013.01); *B32B 27/36* (2013.01); *B32B 37/10* (2013.01); *B32B 37/12* (2013.01); *B32B 37/26* (2013.01); *B32B 2309/02* (2013.01); *B32B 2309/105* (2013.01); *B32B 2309/12* (2013.01); *B32B 2605/006* (2013.01)

(58) Field of Classification Search
  CPC ........ B32B 2037/268; B32B 17/10761; B32B 17/10807; B32B 17/10816; B32B 17/10889; B32B 17/10036; B32B 17/1088; B32B 17/10935; B32B 2309/02; B32B 2309/105; B32B 2309/12; C03B 23/03; C03B 23/0302; Y10T 156/1028
  USPC .......................................... 156/99, 102, 323
  See application file for complete search history.

(56) References Cited

U.S. PATENT DOCUMENTS

| | | | |
|---|---|---|---|
| 4,260,408 A | | 4/1981 | Reese et al. |
| 11,660,842 B2 * | | 5/2023 | Paulus .................... B32B 27/36 428/426 |
| 2004/0226318 A1 | | 11/2004 | Schwartz et al. |
| 2007/0027259 A1 * | | 2/2007 | Yoshida ................. B32B 27/36 525/199 |
| 2014/0141206 A1 | | 5/2014 | Gillard et al. |
| 2015/0122406 A1 | | 5/2015 | Fisher et al. |
| 2019/0381768 A1 | | 12/2019 | Paulus et al. |

FOREIGN PATENT DOCUMENTS

| | | | |
|---|---|---|---|
| EP | 2471762 A1 | 7/2012 |
| GB | 2221424 A | 2/1990 |
| JP | 2003040656 A | 2/2003 |
| JP | 2004534404 A | 11/2004 |
| JP | 2014527011 A | 10/2014 |
| JP | 2015521575 A | 7/2015 |
| JP | 2017508693 A | 3/2017 |
| WO | 03005457 A1 | 1/2003 |
| WO | 2004085324 A1 | 10/2004 |
| WO | 2012073030 A1 | 6/2012 |
| WO | 2013107706 A1 | 7/2013 |
| WO | 2013184904 A1 | 12/2013 |
| WO | 2015031594 A2 | 3/2015 |
| WO | 2015092385 A1 | 6/2015 |
| WO | 2016030678 A1 | 3/2016 |

OTHER PUBLICATIONS

Office Action (Notice of Reasons for Refusal) issued Nov. 9, 2021b by the Japan Patent Office in corresponding Japanese Patent Application No. 2019-560495 and an English Translation of the Office Action. (12 pages).

Written Opinion (PCT/ISA/237) mailed on Apr. 5, 2018, by the European Patent Office as the International Searching Authority for International Application No. PCT/GB050214.

Film—definition of film by The Free Dictionary, form thefreedictionary. com, Dec. 2021.

Beeck, Dr. Manfred-Andreas, et al., "Optical Properties of Automotive Glazing—Design and Feasibility Limitations?", Glass Processing Days, 2003, pp. 502-504.

Kuraray, "Polyvinyl Butyral of Superior Quality", Kuraray.eu [online] available from hllps://www.kuraray.eu/fileadmin/Downloads/pvb/ Mowital_pioloform broschuere 2013_17042013 low_ quality_ secured. pdf [accessed, Jun. 28, 2017.

Search Report issued on Jun. 30, 2017, by the Intellectual Property Office in corresponding United Kingdom Patent Application No. 1701272.5. (4 pages).

* cited by examiner

PROCESS FOR PREPARING A LAMINATED GLAZING

The present application is a continuation of U.S. patent application Ser. No. 16/480,583, filed Jul. 24, 2019, now U.S. Pat. No. 11,660,842, which is a national stage application of PCT International Patent Application No. PCT/GB2018/050214, filed, Jan. 25, 2018, which claims priority of Great Britain Patent Application No. 1701272.5, filed Jan. 25, 2017. The contents of U.S. patent application Ser. No. 16/480,583, PCT International Patent Application No. PCT/GB2018/050214 and Great Britain Patent Application No. 1701272.5 are incorporated herein by reference.

The present invention relates to a process for preparing a laminated glazing and to the use of same in a vehicle. More specifically, the present invention relates to a process for preparing a light weight laminated glazing and to the use of same in a vehicle, especially as a windscreen for a vehicle.

It is known that a laminated glazing for a vehicle windscreen usually comprises two shaped sheets of glass joined by at least one adhesive layer, such as polyvinyl butyral (PVB). It is conventional in the art to refer to each glass sheet as a "ply". Often the adhesive layer itself is also referred to as a "ply", that is, a ply of PVB. The glass sheet configured to face the interior of a vehicle in which the laminated glazing is installed is often referred to as the "inner ply" whilst the glass sheet configured to face the exterior of the vehicle in which the laminated glazing is installed is often referred to as the "outer ply". The two sheets of glass are often comprised of soda-lime silicate glass.

Each of the glass sheets used in a laminated glazing for a vehicle is usually shaped or bent in one or two mutually perpendicular directions such that the laminated glazing is curved. Many methods are known for bending sheets of initially flat glass to a desired curvature to form a windscreen.

For example, one known method is to bend a pair of initially flat glass sheets at the same time, with one sheet of glass on top of another and separated by a suitable "parting powder" such as calcium carbonate. In this way, the inner ply and outer glass ply sheets are heated until malleable, bent and hence shaped at the same time by a gravity sag bending process.

An alternative method of bending glass sheets for a windscreen is to heat and bend the inner ply and the outer ply at different times, usually one after the other, thereby forming the inner ply and the outer ply individually. For example, one such method of bending flat glass sheets individually involves conveying heated flat glass sheets between a pair of complementary shaping members and press bending each glass sheet separately. The glass sheets may then be cooled, brought together and laminated using a suitable adhesive interlayer such as PVB.

For example, EP 0398759 describes how first and second glass sheets combined together into a single laminated glass sheet, are heated in a heating furnace so that the temperature of the first glass sheet and the second glass sheet at the exit of the heating furnace are substantially equal.

WO 2004/085324 A1 describes how glass sheets of an asymmetric glass-sheet pair, intended for the production of laminated glass, are preheated in a preheating furnace and then undergo a press-bending process in a press-bending station. By means of a temperature measuring point arranged at the exit of the press-bending station, it is ensured that the glass sheets exhibit a uniform bending behaviour, in order to guarantee identical restoring forces during cooling.

In U.S. Pat. No. 4,260,408 there is described how glass sheets are shaped by a bending method in which the glass is first shaped to a longitudinal component of bend, by gravity sagging onto an outline mould followed by press bending against a solid lower shaping mould to complete the bend, which includes a complicated transverse component of bend. A particular speed cycle is provided to lift and lower the lower shaping mould to minimize the duration of the shaping cycle and to minimize the chance of misaligning the glass relative to the outline mould during transfer of the glass from the outline mould to the lower shaping mould and its return to the outline mould.

It is also possible to replace damaged glass in a glazing. For example, in GB 2221424 there is described a method for increasing resistance to penetration through a glazed opening, characterized in that the glass is removed from the glazed opening and replaced by laminated glazing consisting of the removed glass, or a pane of substantially identical geometry, to which is fastened, by cementing with the aid of at least one intermediate layer of thermoplastics material, a sheet of thinner glass cut out to have dimensions substantially equal to those of the original glass pane, and which has been subjected to chemical tempering treatment.

However, as optical quality requirements for laminated glazing, especially in automotive applications become more stringent, slight deformations on the surface of the glass that result in an increased optical distortion in transmission, (when looking through glass inclined at an angle to the direction of vision) as is typical when the laminated glazing is installed in a vehicle as a front windscreen, have become increasingly unacceptable.

For example, in WO 2015/092385 there is described a laminated glazing comprising a first ply of glazing material and a second ply of glazing material joined by at least one ply of adhesive interlayer material. The first ply of glazing material comprises a sheet of glass having a first composition and the second ply of glazing material comprises a sheet of glass having a second composition different to the first composition. The laminated glazing has a peripheral region extending around the periphery of the laminated glazing and a surface compression stress in the peripheral region. Also present is an edge compression, wherein the magnitude of edge compression is greater than the magnitude of the surface compression stress in the peripheral region. Whilst this document teaches how to achieve a lightweight windscreen, the optical parameters required for lightweight windscreens are not considered.

In WO 2015/031594 there is disclosed a laminate structure having a first glass layer, a second glass layer, and at least one polymer interlayer between the first and second glass layers. In some embodiments, the first glass layer may be comprised of a strengthened glass having first and second surfaces, the second surface being adjacent the interlayer and chemically polished, and the second glass layer may be comprised of a strengthened glass having third and fourth surfaces. The fourth surface is opposite the interlayer and chemically polished and the third surface is adjacent the interlayer and has a substantially transparent coating formed thereon. In another embodiment, the first glass layer is curved and the second glass layer is substantially planar and cold formed onto the first glass layer to provide a difference in surface compressive stresses on the surfaces of the second glass layer. However, the optical properties for the laminate structure described in this document and prepared using standard lamination procedures are not optimal for lighter weight laminated glazings.

It is known that for achieving good transmission optics, that is, low optical power, in a laminated windscreen comprising two glass sheets and an interlayer, the surfaces of the two glass sheets each facing away from the interlayer (often referred to as surfaces 1 and 4) should have as close to identical curvature as possible.

In addition it is known from "Glass Processing Days, 2003, pages 502-504 that the angle of installation of a vehicle windscreen has an effect on the optical properties. For example, the amplification of optical power varies with installation angle. Therefore, as the angle of installation increases, a much better optical quality is required because any faults present in the windscreen are amplified to a higher degree. One way of overcoming such an issue is to improve the optical quality of the glass used to make the laminated windscreen, however, it is not always possible to produce glass of an improved optical quality at an acceptable commercial cost and yield.

Another way of addressing this issue and of making a laminated glazing having reduced optical distortion when installed in a vehicle is described in WO 2016030678. In this patent application the laminated glazing has first and second sheets of glazing material each separately shaped between a pair of shaping members that are then laminated together. The position for bending the first sheet of glazing material may be deliberately offset from the position for bending the second sheet of glazing material. During the lamination step, the first sheet of glazing material may be displaced relative to the second sheet of glazing material by a lateral and/or longitudinal positional displacement. The first and/or second sheet of glazing material may have been cut such that after lamination at least a portion of the peripheral edges thereof are aligned.

However, in WO 2016030678 the inventors were starting from a position of improving the optical distortion for windscreens installed in vehicles in which each of the sheets of glass have been produced by the same process and are therefore of substantially identical shape and curvature.

There, is an ever increasing need for laminated glazings in the automotive industry with a reduction in the overall weight of the glazing unit.

One way of achieving such light-weight glazing units is to use sheets of glass which are asymmetric. That is, the individual sheets of glass making up the windscreen differ in one or more characteristics such as thickness, colour or emissivity. For example, in WO 2012/073030 there is described a laminated glazing comprising a first ply of glass having a thickness in a range 1.9 to 2.4 mm to provide mechanical strength, a polymer interlayer, and a second much thinner ply of glass having a thickness in the range 0.8 to 1.4 mm, thereby reducing the overall weight of the glazing.

It is possible to produce glass sheets for use in light-weight glazing units of different thickness simultaneously, using for example, gravity bending processes. Alternatively, it is possible to produce each of the asymmetric sheets for use in a light-weight glazing unit separately, using different processes, and thereby take advantage of the benefits provided by each of said processes. For example, it has been shown to be advantageous to use a single glass press-bending operation to prepare an outer glass ply for a light weight glazing unit in order to ensure good shape control and stress level control. However, currently, it is not possible to shape thin glass plies for use in light-weight glazing units by this process to the same level of quality. It has been proposed therefore, to prepare a light-weight glazing unit using a gravity bending process and a chemically toughening process for the inner ply, as described in WO 2015/092385. Unfortunately, this approach often leads to a laminated windscreen which does not always meet the rigorous optical requirements of today's modern laminated windscreen glazings.

Therefore, there exists the need for a process by which asymmetric and light weight laminated glazings such as windscreens may be produced with inner and outer glass plies prepared using different shaping processes or tooling, or in which the glass plies have been produced at different times.

That is, there is a need for a process of making a laminated glazing unit such as a vehicle windscreen using asymmetrical glass plies but which has reduced optical distortion when installed in a vehicle. That is, wherein the inner area of the windscreen especially demonstrates improved transmission optics.

According to a first embodiment of a first aspect of the present invention there is provided a process for preparing a laminated glazing comprising the steps of:
  i) providing a first glass sheet formed into a desired shape with a first thickness by a first procedure;
  ii) providing a second glass sheet formed into a desired shape with a second thickness by a second procedure;
  iii) providing an interlayer located between the first and second glass sheet; and
  iv) laminating together the first and second glass sheets and the interlayer at a temperature and pressure sufficient to adhere the interlayer material to the glass sheets;
  characterised in that the process further comprises the step of:
  v) applying a mould which is shaped substantially the same as the first glass sheet, against the second glass sheet, during laminating to adhere the interlayer material to the two glass sheets such that after lamination, the shape of the second glass sheet is substantially the same as the shape of the first glass sheet.

In an alternative embodiment of the first aspect of the present invention there is provided a process for preparing a laminated glazing comprising the steps of:
  i) providing a first glass sheet formed into a desired shape with a first thickness by a first procedure;
  ii) providing a second glass sheet formed into a desired shape with a second thickness by a second procedure; and
  iii) providing an interlayer located between the first and second glass sheet; characterised in that:
  iv) the first and second glass sheets and the interlayer are laminated together at a temperature in the range of 90° C. to 132° C., and a pressure in the range 8 to 16 bar, to adhere the interlayer material to the two glass sheets; and wherein after laminating, the shape of the second glass sheet is substantially the same as the shape of the first glass sheet.

In accordance with the present invention the thickness of the first glass sheet may be different to the thickness of the second glass sheet. Alternatively, the thickness of the first glass sheet may be the same as the thickness of the second glass sheet. However, the process of the present invention is preferably applied when laminating glass sheets of different thickness, that is, preferably when the thickness of the first glass sheet is different to the thickness of the second glass sheet.

In regard to the present invention, the inventors have found that lamination of the first and second glass sheets preferably occurs at a temperature in the range of 90° C. to 132° C. and a pressure in the range 8 to 16 bar. Alternatively, lamination of the first and second glass sheets preferably occurs at a temperature in the range of 95° C. to 130° C. and a pressure in the range 8 to 16 bar. More preferably, lamination of the first and second glass sheets occurs at a temperature in the range 100° C. to 130° C. Even more preferably lamination of the first and second glass sheets occurs at a temperature in the range of 100° C. to 125° C. or 100° C. to 120° C. or 95° C. to 110° C. Most preferably however, lamination of the first and second glass sheets occurs at a temperature in the range of 100° C. to 110° C. All of the above temperature ranges are preferably used in conjunction with a pressure in the range of 8 to 16 bar.

The lamination step iv) may be conducted using a vacuum bag and/or ring in an autoclave. This step may then be performed at a temperature in the region of 80° C.

It will be appreciated that a range of suitable interlayer materials may be used however, preferably the interlayer comprises polyvinylbutyral.

In relation to the first aspect of the present invention, the first glass sheet is preferably press-bend into the desired shape. That is, for the process according to the first aspect of the present invention, the first procedure used to form the first glass sheet into the desired shape comprises press-bending. Also in relation to the process according to the first aspect of the present invention, the second procedure used to form the second glass sheet into the desired shape comprises gravity sag-bending.

The thickness of the second glass sheet is preferably in the range 0.2 mm to 1.4 mm. More preferably, the thickness of the second glass sheet is in the range 0.5 mm to 1.0 mm or 0.5 to 0.95 mm. The thickness of the second glass sheet may also be in the range 0.5 to 1.2 mm.

The thickness of the first glass sheet is preferably in the range 1.4 mm to 2.5 mm. More preferably, the thickness of the first glass sheet is in the range 1.6 mm to 2.3 mm. The thickness of the first glass sheet may also be in the range 1.6 mm to 2.1 mm.

According to the first embodiment of the first aspect of the present invention the process preferably further comprises the step of:

v) applying a mould against the second glass sheet during lamination wherein the mould is shaped substantially the same as the first glass sheet.

The mould may be comprised of glass, ceramic or metal. However, most preferably the mould is comprised of glass. That is, in a preferred embodiment of the process of the present invention the mould preferably comprises a third glass sheet which is substantially the same shape as the first glass sheet.

Preferably, the third glass sheet is formed into the desired shape by press bending prior to use in the lamination of the first and second glass sheets.

The thickness of the third glass sheet is preferably in the range 1.4 mm to 2.5 mm. More preferably, the thickness of the third glass sheet is in the range 1.6 mm to 2.3 mm. The thickness of the third glass sheet may also be in the range 1.6 mm to 2.1 mm.

In addition, it is preferred that the first and third glass sheets are preferably prepared in a single press-bending batch process. Consequently, the first and third glass sheets will be substantially the same thickness.

The process according to the first embodiment of the first aspect of the present invention preferably further comprises the step of:

vi) providing a foil layer between the second glass sheet and the mould shaped substantially the same as the first glass sheet.

That is, the first embodiment of the first aspect of the present invention preferably further comprises the step of:

vi) providing a foil layer between the second glass sheet and the third glass sheet, said third glass sheet being shaped substantially the same as the first glass sheet.

The foil layer preferably comprises a thickness of between 0.05 mm and 0.2 mm. In addition, the foil layer preferably comprises a non-stick film. Suitable non-stick films ensure that the foil layer, the second glass sheet and the third glass sheet readily separate after the lamination process. A preferred non-stick foil layer film material comprises polyester.

Therefore, also in relation to the first aspect of the present invention, after lamination is complete, the third glass sheet and the foil layer are removed from the laminated first and second glass sheets. Even more preferably, post lamination the foil layer and the mould shaped substantially the same as the first glass sheet (preferably in the form of a third glass sheet), are removed from the laminated first and second glass sheets in a single step.

It is preferred therefore that in accordance with the first aspect of the present invention there is provided a laminated glazing in which:

the first glass sheet comprises a first glass outer-face and a first glass sheet inner face; and the second glass sheet comprises a second glass sheet outer-face and a second glass sheet inner face; and wherein the first glass sheet inner face and the second glass sheet inner face are located closest to the interlayer; and wherein for a given point on the laminated glazing, the difference between the curvature of the first glass sheet and the curvature of the second glass sheet at the given point on the laminated glazing produced by the process of the first aspect of the present invention, is of a significantly low value that an acceptably low value for optical power in transmission is provided. That is, low levels of distortion are seen by the driver of a vehicle into which the laminated glazing is installed.

That is, it is preferred that, a laminated glazing prepared according to the process of the first aspect of the invention demonstrates optical power in transmission values which are no higher than 130% of the value recorded for a laminated glazing prepared by laminating two identical glass sheets.

In such case, the optical power in transmission of the laminated glazing is measured by devices described according to agreement ECE R43 standard, or by devices prepared by the company ISRA Vision AG, or in accordance with the appropriate VDA Recommendation, such as VDA 312 Recommendation (March 2015) which relates to 'The requirements to test facilities for inspection of the visual distortion at vehicle panes in transmission'.

According to a second aspect of the present invention there is provided a laminated glazing suitable for use in a vehicle and prepared according to any of the features described above in relation to the first or alternative embodiments of the aspect of the present invention, said features being present either alone or in combination.

Also according to the second aspect of the present invention there is provided a laminated glazing suitable for use in a vehicle and prepared according to any of the features described above in relation to the first embodiment of the aspect of the present invention wherein said glazing comprises a 37% improvement in optical power compared with a laminated glazing prepared by a laminating method which does not apply a mould which is shaped substantially the same as the first glass sheet, against the second glass sheet during laminating.

According to a third aspect of the present invention there is provided the use of a laminated glazing prepared in accordance with any combination of the features of the first or second aspect of present invention, installed in a vehicle.

In accordance with the first, second or third aspects of the present invention the laminated glazing may be any glass article used in a vehicle. However, it is preferred that the laminated glazing according to the first, second or third aspects of the present invention is a vehicle windscreen or vehicle rear window.

Embodiments of the present invention will now be described by way of example only with reference to the following examples and accompanying drawings, in which.

In relation to the present invention, the inventors have found that when preparing a laminated glazing such as a vehicle windscreen with two curved glass sheets or plies, in which one of the glass sheets is of a reduced thickness compared with the thickness of the second glass sheet, and in which the glass sheets have been formed into a curved structure using different techniques, the thinner glass sheet may be successfully moulded to the curvature and shape of the thicker and more rigid glass sheet using a modified glass processing technique as will be described further herein.

Figure 2:
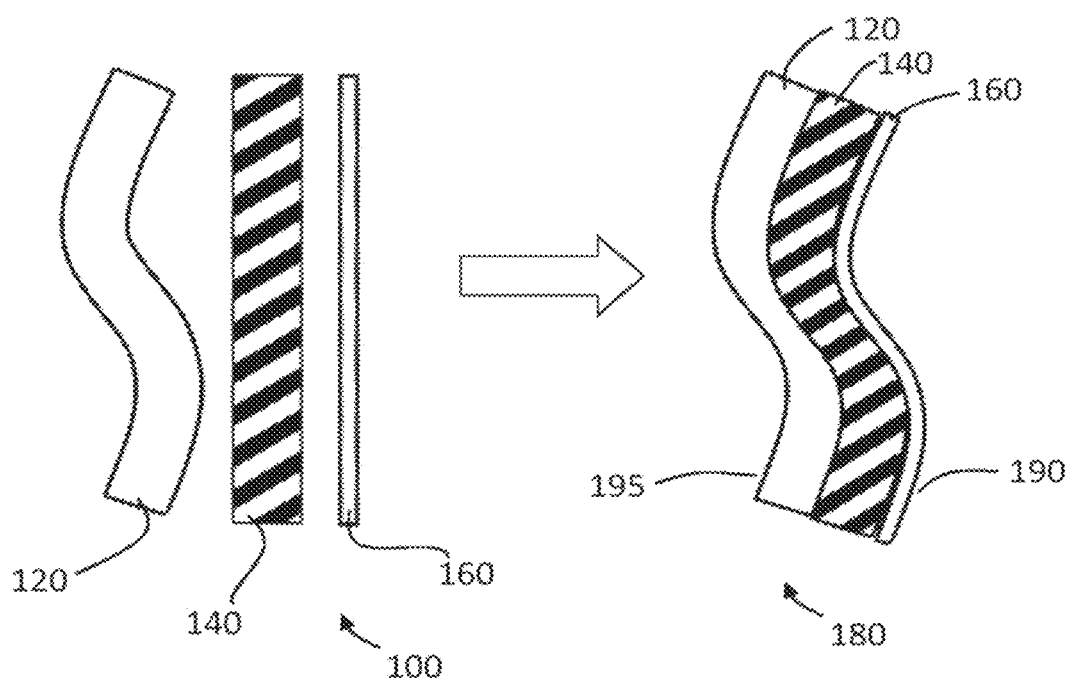
FIG. 2 is a schematic representation of a first embodiment of a method of preparing a laminated windscreen according to a first aspect of the present invention.
Figure 3:
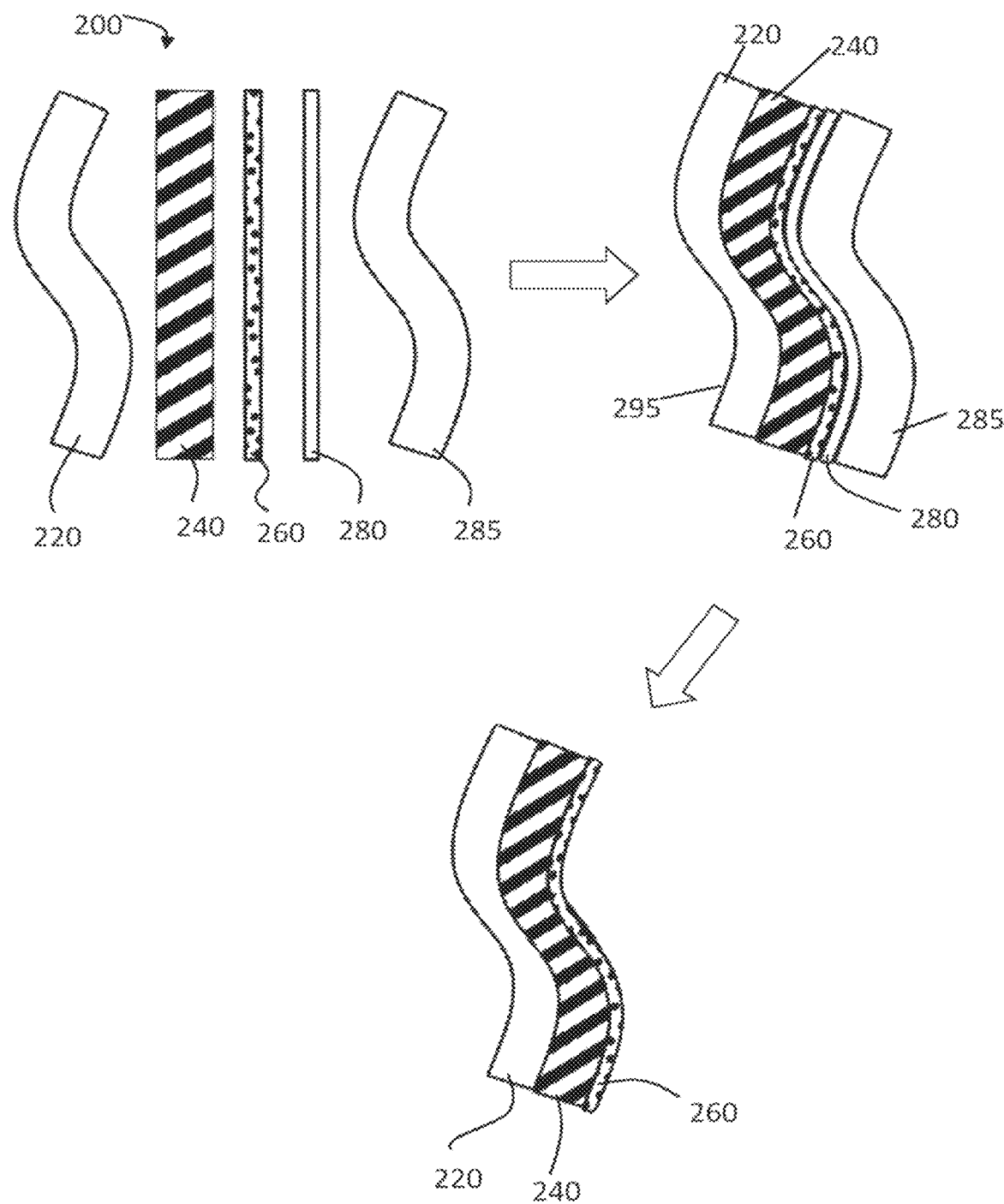
FIG. 3 is a schematic representation of an alternative embodiment of a method of preparing a laminated windscreen according to a first aspect of the present invention.

The inventors have also found that harmonisation of the curved shape of the two glass sheets in a laminated windscreen may be achieved using a procedure described according to the process of the present invention. The methods according to the present invention are described further below by way of example in relation to and as illustrated in FIGS. 2 and 3 respectively.

The laminated glazing prepared by each of the methods described below may be preferably curved in two directions, with each direction of curvature orthogonal to the other. The radius of curvature in one or both directions may be preferably between 300 mm and 8000 mm.

Figure 1:
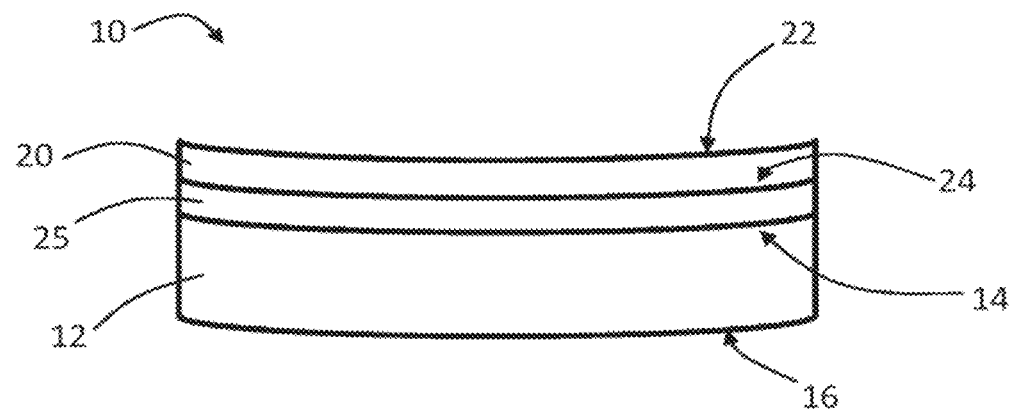
FIG. 1 is a simplified cross-sectional view of a laminated glazing prepared in accordance with the present invention.

As illustrated in FIG. 1, in a laminated glazing 10 prepared in accordance with the method of the present invention, preferably there is provided a first ply (or glass sheet) 12 having a concave surface 14 and an opposing convex surface 16. There is also provided a second ply (or glass sheet) 20 having a convex surface 24 and an opposing concave surface 22. The concave surface 14 of the first ply 12 is in contact with an interlayer 25 and the convex surface 24 of the second ply 20 is in contact also with the interlayer 25.

Using conventional nomenclature, the convex surface 16 of the first ply 12 is referred to as "surface one" (or S1) of the laminated glazing 10. The concave surface 14 of first ply 12 is referred to as "surface two" (or S2) of the laminated glazing 10. The convex surface 24 of the second ply 20 is referred to as "surface three" (or S3) of the laminated glazing 1, and the concave surface 22 of the second ply 20 is referred to as "surface four" (or S4) of the laminated glazing 10.

In relation to the present invention the laminated glazing 10 may be a vehicle glazing such as a vehicle windscreen (front or back), a vehicle sunroof, a vehicle sidelight or a vehicle backlight. The laminated glazing 10 may be also a glazing for a building.

Method 1.

In FIG. 2 there is illustrated a schematic representation 180 of an embodiment of the first method of preparing a laminated glazing such as a vehicle windscreen according to a first aspect of the present invention.

In a first step of the method, a first glass sheet 120 is formed into the desired shape of for example a windscreen glazing. This may be achieved by taking a flat sheet of glass, such as soda lime silicate glass, and cutting the sheet of glass into a shape with the required edge profile. The glass sheet is then heated to a malleable state and moulded generally by for example, press-bending.

In press-bending, the process uses a pair of complementary shaping moulds; an upper shaping mould and a lower complementary shaping mould. Press-bending commonly involves the use of at least one heated shaping mould. The press-bending process is used to form the glass sheet into the shape of for example the required windscreen with a radius of curvature in one or more directions of between 300 mm and 8000 mm.

Next, in the first method of preparing a laminated glazing according to the present invention, a second thinner flat sheet of for example soda lime silicate glass 160 is cut into shape with the required edge profile. This second glass sheet is also moulded into an equal or less curved shape of the desired windscreen glazing, using for example, a gravity or sag bending process. That is, the required shape of the second glass sheet is achieved by a shaping process which is different to the process used to shape the first glass sheet for the windscreen glazing.

In a gravity sag-bending process, a sheet or ply of correctly sized flat glass is placed atop a bending ring and heated to a temperature at which the glass becomes malleable and sags freely under gravity. Sagging continues until the malleability of the glass is reduced by lowering the temperature. In the method of the present invention which seeks to bend a thin ply of glass, the final required shape of the second glass sheet for use in a laminated glazing is not completely achieved at this stage by the gravity sag-bending process.

As with the first sheet of glass, the second glass sheet is moulded with a radius of curvature in one or more directions of between 300 mm and 8000 mm. The second sheet of glass is however much thinner than the first sheet of glass. The second sheet of glass may be as much as 65% less than the thickness of the first sheet of glass. For example, the thickness of the first glass sheet may be in the range of: 1.4 mm to 2.5 mm; or in the range of 1.6 mm to 2.3 mm. The thickness of the second glass sheet however may be in the range of: 0.2 to 1.4 mm, or in the range of 0.5 mm to 1.0 mm. The thickness of the first glass sheet may also be in the range 1.6 mm to 2.1 mm.

The first and second pre-moulded glass sheets are then combined and joined together by an adhesive interlayer 140. The adhesive interlayer may have a thickness range of 0.3 mm to 1.8 mm thick, or the adhesive interlayer may have a thickness range of 0.5 mm to 1.0 mm. Typically however, the adhesive interlayer material preferably has a thickness of 0.76 mm. Suitable adhesive interlayers which may be used in the method of the present invention include but are not limited to for example: polyvinylchloride (PVC), polyvinylbutyral (PVB), Ethylene-vinyl acetate (EVA), also known as poly(ethylene-vinyl acetate) (PEVA), ethyl methyl acrylate (EMA) and polyurethane. A preferred interlayer used in the method of the present invention is however polyvinyl butyral (PVB).

The first and second pre-moulded glass sheets 120, 160 are then joined together with the adhesive interlayer 140 in a 'pre-nip' process. The 'pre-nip' process involves removing air trapped between the glass sheets 120, 160 and the adhesive interlayer 140. The air may be removed by applying a vacuum to the combination of glass sheets and adhesive interlayer. Alternatively, the trapped air may be removed by compression, in which case the air is expelled from between the glass sheets and adhesive interlayer.

In a final step of the method the glass sheets 120, 160 and adhesive interlayer are joined together in an autoclave process which laminates the glass sheets and interlayer into the required shape of the desired laminated glazing. That is, lamination of the glass sheets and adhesive interlayer is completed using an autoclave. In the autoclave, a typical pressure range for the lamination process in accordance with the first method of the present invention is in the range 10 bar to 16 bar, fora period of 30 to 120 minutes.

A typical temperature range for the lamination process in accordance with the first method of the present invention is in the range 100° C. to 130° C. for a period of 30 to 120 minutes. That is, the autoclave temperature range employed for the lamination process is lower than it typically used for the lamination of glazing.

The choice of suitable temperature and pressure parameters enables the interlayer such as polyvinylbutyral (PVB) to form a suitable adhesive bond between the glass sheets. In addition, the temperature and pressure parameters are preferably selected in such a way that the flow within the laminate structure is minimal, thus forcing the thinner sheet or ply of glass to follow the shape of the thicker sheet or ply of glass.

The laminated glazing 10 prepared in accordance with the method of the present invention may be curved in one or more directions. The radius of curvature in each of the one or more directions may be for example between 300 mm and 8000 mm. When the laminated glazing is curved in two directions, each direction of curvature is suitably orthogonal to the other.

Once the lamination stage of the process is complete, the laminated glazing 180 such as a vehicle windscreen is removed from the autoclave, washed, and packaged ready for use.

The inventors have found that by using the method described above it is possible to achieve a laminated glazing in which the curvature of the outer surface 190 (S4) of the thinner second ply 160 (inner surface when positioned in a vehicle) and the curvature of the outer surface 195 of the first thicker ply 120 differ less than the same surfaces of plies in a laminated glazing prepared using standard processes and parameters.

The effect of the increase in the curvature of the surface 190 (S4) of the thinner second ply 160 and the curvature of the outer surface 195 of the first thicker ply 120 is that the optical distortion apparent when looking through the laminated windscreen, and measured as optical power (as described above), is significantly reduced.

In Table 1 there is provided a summary of the process parameters used for example in an autoclave to prepare a laminated glazing in accordance with the first method of the present invention.

TABLE 1

| Method 1 | Parameter values used in the method of the present invention | Parameter values used for standard lamination procedures |
|---|---|---|
| Temperature range of autoclave (° C.) | 100° C. to 130° C. | 135° C. to 140° C. |
| Pressure range of autoclave (bar) | 10 bar to 16 bar | 10 to 13 bar. |
| Time for lamination in autoclave (minutes) | 30 to 120 minutes | 30 to 120 minutes |
| Thickness of first thicker glass ply | 1.4 to 2.5 mm | — |
| Thickness of second thinner glass ply | 0.2 to 1.4 mm | — |

By using the method described above within the parameters set out in Table 1, the inventors are able to achieve a superior laminated glazing by taking advantage of the fact that the thinner, inner, glass sheet is more flexible than the outer, thicker glass sheet. Using the preferred parameter ranges it is also possible to conduct the autoclave process with conditions which allow the interlayer (preferably in the form of PVB) to adhere to the glass sheets and provide good lamination performance, whilst maintaining the rigidity of the PVB. This is an important feature of laminated glazing, and an especially important feature for laminated glazing used in vehicles.

More particularly, it can be seen that by using the method of the present invention, lamination of two glass sheets and an interlayer may be achieved by lowering the autoclave temperature to that below the typical autoclave temperature of 135° C. to 140° C., to 90° C. to 132° C., or even 100° C. to 130° C., at the typical autoclave pressure of 10 to 13 bar.

Most particularly however, it has been found that by a careful selection of the required parameters for the autoclave process in the method of the present invention, lamination of two glass sheets and an interlayer for forming a light-weight windscreen may be achieved in such a way that the optical power in transmission (or the visible distortions) recorded for such a laminated glazing are significantly reduced compared with the same values recorded for a laminated glazing prepared using standard autoclave conditions.

Preferably, the recorded optical power of a laminated windscreen prepared using the method of the present invention does not exceed 50% of the value recorded for a standard windscreen with glass plies of thickness 2.1 mm.

The recorded optical power values for the lighter-weight laminated glazing prepared by the method of the present invention are also significantly improved compared with the recorded optical power values obtained for a lightweight laminated glazing prepared by conventional means, and which typically exceed 80% to 110% of the optical power values recorded for a standard windscreen.

Method 2.

In FIG. 3 there is illustrated a schematic representation 200 of a second method of preparing a laminated glazing such as a vehicle windscreen according to a first aspect of the present invention.

In method 2, a first glass sheet 220 (which may be flat) such as soda lime silicate glass, is formed into the desired shape of a windscreen as described in relation to method 1 above by for example press-bending.

Next, a second thinner flat sheet of glass 260 (such as soda lime silicate glass) is cut into a shape with the required edge profile. The second glass sheet is then moulded into an equal or less curved shape of the desired windscreen glazing, by for example a gravity or sag bending process as also described above in relation to method 1. That is, the required shape of the second glass sheet is achieved again by a shaping process which is different to the process used to shape the first glass sheet for the windscreen glazing.

As with the method 1, the glass sheets may be moulded with a radius of curvature in one or more directions of between for example 300 mm and 8000 mm. The second sheet of glass is much thinner than the first sheet of glass, and the two glass sheets are formed using different techniques. For example, the thickness of the first glass sheet may be in the range of: 1.4 mm to 2.5 mm; or in the range of 1.6 mm to 2.3 mm. The thickness of the second glass sheet however may be in the range of: 0.2 to 1.4 mm; or in the range of 0.5 mm to 1.0 mm.

The first and second moulded glass sheets are then combined and joined together by an adhesive interlayer 240. The adhesive interlayer may again be as described in relation to method 1 above and is preferably polyvinyl butyral (PVB) with a thickness preferably of 0.76 mm. Additional adhesive interlayers which may be used in the method of the present invention include but are not limited to for example: polyvinylchloride (PVC), ethylene-vinyl acetate (EVA), also known as poly(ethylene-vinyl acetate) (PEVA), ethyl methyl acrylate (EMA) and polyurethane.

In contrast to method 1 described above however, method 2 employs a modification such that prior to the 'pre-nip' stage, in which air is eliminated from between the two moulded glass sheets and adhesive interlayer, in method 2, a thin layer of foil 280 is applied in between the outer surface (S4) 290 of the second glass sheet which is not in contact with the adhesive interlayer and a shaped mould 285.

The thin foil layer 280 is preferably a non-stick film, which is placed between the second glass sheet 260 and the mould 285 to prevent scratching. Suitable thin foils may include for example but are not limited to: polyester films available from Hostophan Films or Mitsubishi Polyester Film GmbH under the brand names of Hostaphan® and Diafoil®.

The shaped mould 285 is preferably sized and shaped to match the profile of the first glass ply 220. The mould may be comprised of a suitable material such as for example a plastic, glass or ceramic material.

More preferably however, the mould is a glass sheet prepared by the same batch process used to prepare the outer glass sheet 220 and thereby formed to be substantially the same shape as the first glass sheet. This mould is referred to herein a slave mould or slave glass.

The first and second pre-moulded glass sheets 220, 260 may then be combined together with the adhesive interlayer 240 in a 'pre-nip' process in combination with the thin foil 280 and slave mould or glass 285 in an arrangement 300 as indicated in FIG. 3. That is, with the face 295 of the first glass sheet 220 and the face 298 of the slave mould or glass 285 forming the two outer faces of a 'pre-nip' structure, and with the second thinner glass sheet 260 separated from the first glass sheet 220 and the outer glass sheet 285 by the interlayer material 240 on the side of the first glass sheet and by a thin foil layer 280 on the side of the slave glass 285.

The air trapped between the glass sheets 220, 260 and adhesive interlayer 240 is then removed as in method 1 using for example a vacuum extraction technique or a nip roller process.

Lamination of the glass sheets and adhesive interlayer is then completed using an autoclave. The pressure range used for the autoclave lamination in the second method of the present invention is typically in the range 10 bar to 13 bar, for a period of 30 to 60 minutes. The temperature range used for the lamination in accordance with the second method is typically in the range 90° C. to 132° C., or even 100° C. to 110° C., for a period of 30 to 60 minutes. In a preferred embodiment of the second method according to the present invention, the temperature for the lamination process may be in the region of 105° C., and the pressure may be around 10 bar for a period of around 45 minutes.

The choice of suitable temperature and pressure parameters in method 2 enables the interlayer such as polyvinylbutyral (PVB) to form a suitable adhesive bond between the glass sheets. That is, the temperature and pressure parameters are preferably selected in such a way that flow within the laminate structure is minimal, thus forcing the thinner sheet or ply of glass to follow the shape of the thicker sheet or ply of glass and also the shape of the slave glass. In addition, it is preferred that if a vacuum ring or vacuum bag is employed in the 'pre-nip' process to hold the slave glass in place, then this may be used also during the autoclave process.

Whilst an autoclave is preferably employed in the lamination process according to the present invention, it will be appreciated by one skilled in the art that were appropriate, it is also possible to utilize an oven equipped with vacuum ports in place of the autoclave to draw a vacuum from the vacuum ring or vacuum bag using suitable parameters as outlined above for the autoclave process.

The resultant laminated glazing prepared may be curved in one or more directions. The radius of curvature in each of the one or more directions may be between 300 mm and 8000 mm. When the laminated glazing is curved in two directions, each direction of curvature is suitably orthogonal to the other.

Once the lamination process is complete, the laminated glazing structure such as a windscreen may be removed from the autoclave. The slave mould or glass 285 and the thin film 280 may then be removed from the laminated first and second glass sheets to obtain a laminated glazing 400 which once washed, is ready for use.

In addition, use of the thin foil layer 280 allows easy separation of the inner glass layer 260 from the slave glass mould 285, and also protects the surface 290 of the inner glass layer and the inner surface 284 of the slave glass mould 286 from scratches. Once the slave glass mould has been separated from the laminated glass plies, it is possible to re-use the slave glass mould in a second iteration of method 2. The slave glass mould may be used as a slave mould again or alternatively, the slave glass mould may be use as the first glass sheet 220. In this way, method 2 offers advantages such as: it avoids the generation of excess waste glass as the slave glass mould may be reused; and in addition, the laminated glazing prepared by the method has improved optical properties.

The inventors have found that by using method 2 described above it is possible to achieve a laminated glazing in which the curvature of the inner surface 290 (S4) of the second sheet 260 and the curvature of the outer surface 295 of the first sheet 220 are substantially or almost identical.

That is, by using the method of the present invention, the inventors have found that it is possible to adapt the second thinner glass sheet (or inner glass) to adopt the shape of the first thicker glass sheet (or outer glass).

The inventors have also found that a preferred slave glass or mould 285 for use in the method of the present invention is another shaped first glass sheet which follows the same profile as the first glass sheet, and which may be formed in for example the same press-bending batch process as the first glass sheet.

The laminated glazing prepared in the embodiments of the present invention described above, preferably comprise sheets of soda-lime silicate glass having a composition such as clear float glass. The glass sheets may for example also comprise iron oxide as a tinting agent to provide the laminated glazing with a measure of solar control.

A typical soda-lime silicate glass composition may comprise by weight for example: $SiO_2$ 69-74%; $Al_2O_3$, $Na_2O$ 10-16%; $K_2O$ 0-5%; MgO 0-6%; CaO 5-14%; $SO_3$ 0-2%; and $Fe_2O_3$ 0.005-2%.

The glass sheets may also contain other additives, for example refining aids, which would normally be present in an amount up to 2%. The soda-lime silicate glass composition may also contain other colouring agents such as $CO_3O_4$, NiO and Se to impart to the glass composition a desired colour when viewed in transmitted light.

Also, the soda-lime silicate glass composition for each of the glass sheets used in the methods of the present invention may be the same or different.

In addition, one or more of the glass sheets used in the methods of the present invention may be chemically toughened. Chemical toughening or strengthening involves treating glass sheets with for example a potassium salt solution such as potassium nitrate in which the glass sheets are submersed at a temperature in the range 300° C. to 460° C., more preferably at a temperature in the range 400° C. to 460° C., most preferably at a temperature in the range 420 to 460° C., such as around 450° C. Immersion of the glass in the potassium salt causes sodium ions in the glass surface to be replaced by potassium ions from the solution to impart additional impact resistance to the glass sheets when laminated.

Also in accordance with the method of the present invention, the outer surface S1 may preferably have a surface residual compression stress ranging from 10 MPa to 20 MPa, in for example a 300 mm band extending around the periphery of the windscreen.

That is, the surface compression stress for the convex surface S1 of for example the first glass sheet 120, 220 of the laminated glazing may have an edge region having a residual edge stress with a net tension below 11 MPa and an edge compression above 25 MPa.

Figure 8:
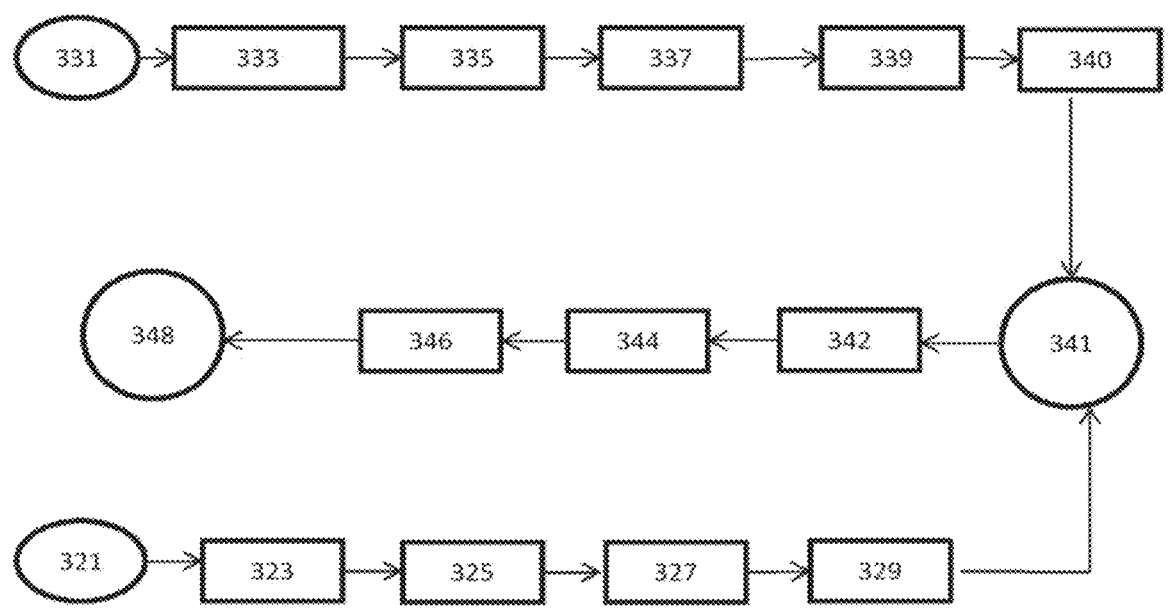
FIG. 8 is a summary flowchart diagram for first and second embodiments of the method of preparing a laminated windscreen glazing in accordance with the present invention.

In FIG. 8 there is provided a summary flowchart diagram for example methods of preparing a laminated glazing such as a windscreen in accordance with the present invention.

Initially a first sheet of for example soda-lime silicate glass is provided at step 321. The soda-lime-silicate glass may be clear or tinted. By clear float glass, is meant a glass sheet having a composition as defined in BS EN 572-1 and BS EN 572-2 (2004) incorporated herein by reference.

At step 323 the first glass sheet is cut and shaped generally to the desired shape using conventional techniques such as for example press-bending. The glass sheet of clear float glass may have a thickness for example in the range of 1.4 to 2.5 mm. At step 325 the edges of the glass sheet (also known as an outer blank) are smoothed or 'edge-worked', following which the glass sheet is washed.

After washing, one or both major surfaces of the glass sheet may be printed as required for the final product. For example, if the final product is a vehicle windscreen, a layer of ink, which may be optically opaque and/or electrically conductive, may be printed around the periphery of the glass sheet to form an obscuration band, as is conventional in the art.

In step 327 the glass sheet is heated to glass softening temperature in a suitable furnace. The heat-softened glass may then be press-bent between a pair of complementary shaping members to impart a desired curvature to the outer sheet. Press bending allows precise control of the shape of the glass sheet. Examples of press-bending stations and operations are described in WO2005/033026A1 and EP0677486A2. Once bent, the cut sheet of for example clear float glass proceeds as the first sheet of the laminated glazing such as a windscreen.

To control the stresses in the first glass sheet, the upper and/or lower press bending shaping members may be heated to control the residual edge stress and/or the edge compression of the outer sheet. By selection of the required temperature of the upper and/or lower press bending shaping members it is possible to produce an outer sheet having an edge region having a residual edge stress with for example a net tension below 11 MPa and an edge compression above 25 MPa.

The residual surface stress may also be controlled by directing cooling air around the periphery of the bent glass sheet shortly after completion of the press-bending operation and before cooling the bent sheet to room temperature.

After cooling air has been directed onto the edges of the glass sheet for a suitable length of time to produce the required residual stress in the cooled bent glass sheet, the bent glass sheet is controllably cooled at step 329 to room temperature in a suitable annealing furnace.

Bending a series of glass sheets may form part of a batch process, in which a number of the first glass sheets are bent one after another. In this way, one of the glass sheets from the batch may be used as the first glass sheet in a laminated glazing and another of the glass sheets from the same batch may be used as a slave glass mould during the autoclave procedure as described below.

The first glass sheet may be bent in one or more directions. The curvature in the one or more directions may have a radius of curvature between 300 mm and 8000 mm.

The second glass sheet of the laminated glazing is produced as follows.

At step 331 a second sheet of for example soda-lime silicate glass is provided. The soda lime silicate glass may be clear or tinted or the soda-lime silicate glass may be modified. In this example a sheet of clear float glass is provided at step 331.

The second sheet of soda-lime silicate glass may preferably have a thickness in the region of for example 0.7 mm or less, and is cut at step 333 to have the same periphery as the unbent first glass sheet (or outer blank). Before being bent, the cut second sheet of soda-lime silicate glass may be referred to also as the inner blank. The second sheet of soda-lime silicate glass may for example have a thickness of between 0.2 mm and 1.4 mm. Alternatively, second sheet of soda-lime silicate glass may for example have a thickness of between 0.5 mm and 1 mm.

At step 335, the second glass sheet is preferably suitably edge worked and washed prior to being bent.

At step 337 the second glass sheet is preferably placed on a suitable ring mould to support the second glass sheet close to the periphery thereof. The second glass sheet is then heated to a sufficient temperature to cause the soda-lime silicate glass to soften and sag under the influence of gravity. This procedure is conventionally referred to as gravity or sag bending. The glass sags or bends to a shape close to that of the bent first glass sheet. However, at this point, the curvature of the second glass sheet may not be the same as the first glass sheet.

At step 339 the bent second glass sheet is annealed using controlled cooling to reduce the temperature to room temperature.

At step 340 the bent second glass sheet of soda-lime silicate glass may be chemically strengthened using for example an ion exchange process, wherein typically, sodium ions in the second glass sheet are chemically exchanged for potassium ions.

It is also envisaged that the bent second glass sheet of soda-lime silicate glass may be thermally toughened, even though it may be difficult to thermally toughen sheets of glass that have a thickness of 1 mm or less.

At step 341 a bent first glass sheet (following steps 321-329) and a bent second glass sheet (following steps 331-340) are provided.

The pair of bent first and second glass sheets are washed at step 342, and at step 344 a sheet of interlayer material such as for example, polyvinyl butyral, having a thickness of between 0.3 mm and 1.5 mm may be positioned between the first glass sheet and the second glass sheet.

In this particular example, the interlayer material may preferably be a 0.76 mm thick sheet of polyvinyl butyral (PVB), although other suitable adhesive interlayer material may be used.

Alternatively, at step 345, in addition to the positioning of a suitable interlayer between the bent first and second glass sheets, a thin foil layer may also be placed on the opposite side of the bent second glass layer to the interlayer. In addition, a mould in the form of another bent first glass sheet (or outer blank) may be placed on the opposing side of the thin foil layer to the bent second glass sheet.

At step 346 the assembly of first glass sheet, and the second glass sheet with the PVB sheet there between, with or without the additional foil layer and with the slave mould (such as an additional bent first glass sheet) are then autoclaved using suitable conditions as defined above in relation to Method 1 or Method 2, to join the first glass sheet to the second glass sheet via the PVB sheet, which serves to adhere the two glass sheets together.

In step 347 the foil layer and slave mould are then removed, and at step 349 if the slave mould is in the form of another first glass sheet, this may be washed and recycled back into step 341, either as a bent first glass sheet for lamination or as a slave mould again.

The laminated glazing so produced at step 348 is washed and inspected prior to being delivered to a customer.

Results

In order to provide evidence of the proposed beneficial effect of the methods according to the first aspect of the present invention laminated glazing and individual glass sheets were examined using deflectometric measurement of curvature tests.

It is generally known in the field of optics that, the curvature of both surfaces of a transparent body, in particular the difference in the curvatures, provides the optical power of the transparent body.

The deflectometric measurement method is a reliable procedure used to measure the curvature of a shiny surface. In a laminated glazing, were the inner and outer (or first and second) glass sheets may be shaped differently, steps have to be taken when analyzing the glazing to suppress the signal from the 'back' surface, that is, the surface which is not intended to be analyzed. This may be achieved by using black adhesive tapes.

The deflectometric measurement test method uses a sensor technique which is based on the principle of measuring phase deflectometry.

In the deflectometric measurement method, to calculate the local slope of a surface, a fringe pattern with a sinusoidal profile is projected onto a white board. A video camera observes the reflections of this pattern via the surface under test. The local slope of the surface may be directly calculated from the distortions of the observed fringe pattern. This technique provides advantages when compared with range measuring methods since for curvature computation the data has to be differentiated only once. Thus, the amplification of high frequency noise is reduced compared with the case of range data, which has to be differentiated twice.

The deflectometric measurement method calculations used for the measurement of laminated glazings prepared according to the method of the present invention, were therefore performed using a measurement system, available from the company 3D-Shape GmbH. Such systems are also available for example from the company ISRA Vision AG.

Figure 4:
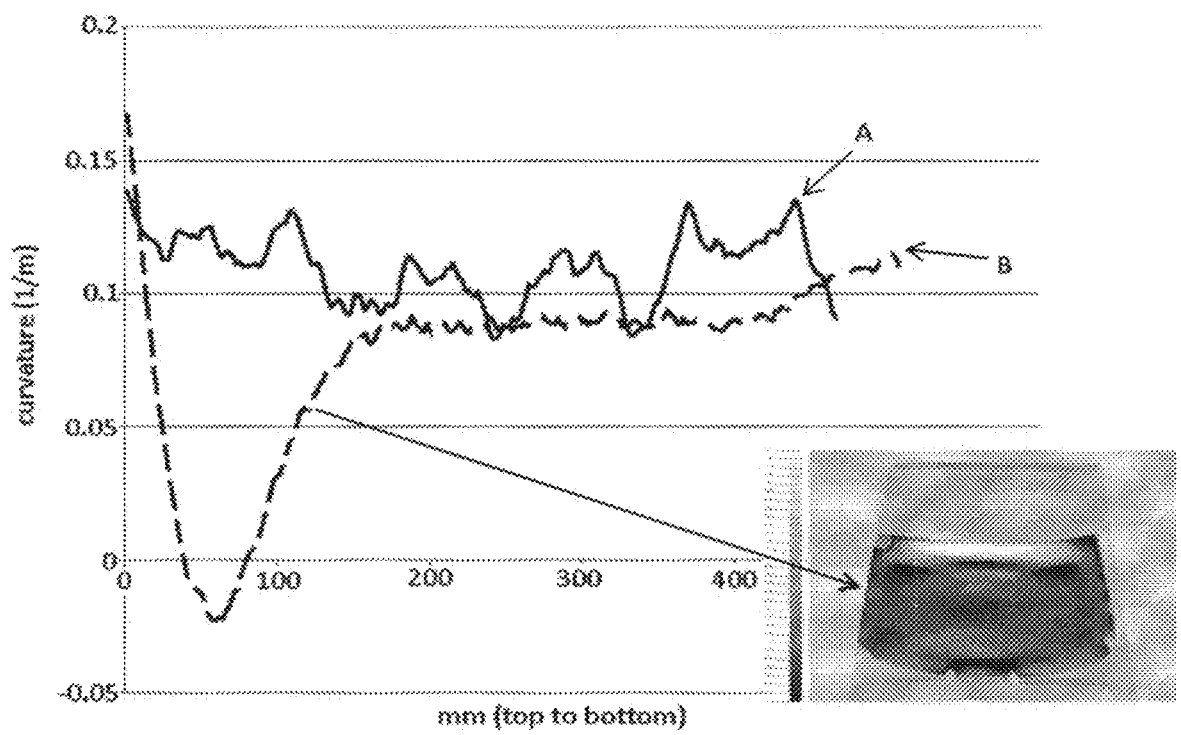
FIG. 4 is a graphical representation of example curvature measurements recorded for a laminated windscreen glazing.

In FIG. 4 there is illustrated an example graphical representation depicting the measurement of curvature for both of the single glass sheets or plies in a laminated glazing such as a windscreen. In the graphical representation in FIG. 4, the vertical axis indicates the curvature values (in $m^{-1}$) measured along a vertical line of the windscreen glass as indicated in the picture insert shown. The horizontal axis measures the distance in mm from the top to the bottom of the windscreen sheet. The darker line on the graph (A) relates to the measurement of the first or outer glass illustrating a distinct structure. The lighter line (B) on the graph relates to the measurement of the surface of the second or inner glass which is smooth in the centre, but which has a clear change of curvature in the upper part of the glass ply. It is not the objective of the present invention to discuss the background of these structures. For the purposes of the use of the technique in relation to the present invention, it is sufficient that the glass sheets have different characteristics, dependent upon the shaping processes involved in their formation.

In accordance with the present invention two sample laminated windscreens were prepared following method 2 described above. The windscreens were analyzed by visual inspection, and curvature values were measured along an identical line on each sample (as indicated in the insert picture in FIG. 4). The outside (or outer) surface of the laminated windscreen (that is the surface which will be exposed to the outside of the vehicle when fitted) was measured, that is surface S1, with the inner surface, S4 being suppressed. The inner surface of the laminated windscreen was also measured, that is surface S4, with the outer surface, S1 being suppressed.

Figure 5:
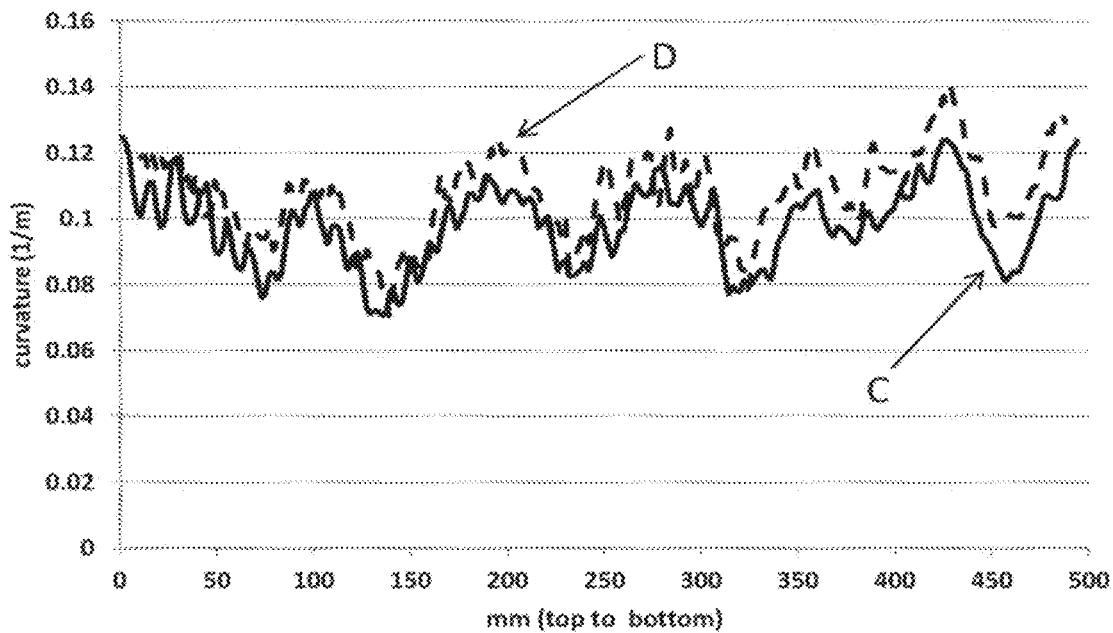
FIG. 5 is a graphical representation illustrating example comparison in curvature measurements recorded for the inner and outer sheets of a windscreen glazing prepared according to the present invention.

FIG. 5 provides an example of a measurement of curvature for two plies of glass. By using an optical method, the curvature of the outer surface S1 of the outer glass and the curvature of the outer surface S4 of the inner glass, (both measured in 1/m) are illustrated as a function of the vertical position along a vertical line on the glass.

The results of the curvature measurements are provided in FIG. 5. In FIG. 5, the darker coloured curve (C) depicts the curvature values for the outer (S1) surface, and the lighter coloured curve (D) depicts the corresponding inner surface S4. It is clear from FIG. 5 that, apart from measurement uncertainties, both surfaces 'fit' together, that is, the curvatures of each surface S1 and S4 follow a common profile. That is, by analysing the data shown in FIG. 5, one finds that the curvature data for both surfaces S1 and S4 differ on average by only 0.0101 m$^{-1}$, with the maximum difference only 0.026 The data confirms therefore, that both surfaces are almost identical in terms of curvature Therefore, whilst it may be seen from FIG. 5, that both surfaces exhibit nearly identical structures, in contrast, FIG. 4 illustrates an equivalent measurement of single glass plies, where there are clear differences in curvature between the glass plies.

As a result of the alignment in the curvature of the inner S4 and outer S1 surfaces of the windscreen, the transmission optics for a laminated windscreen prepared in accordance with the present invention are significantly improved. That is, the curvature values for the outer glass sheet S1 are a substantial match for the curvature values recorded for the inner sheet S4 produced using the method of the present invention, with minimal lens effects, transmissive optical distortion or cloudiness appearing on the laminated windscreen.

Figure 6:
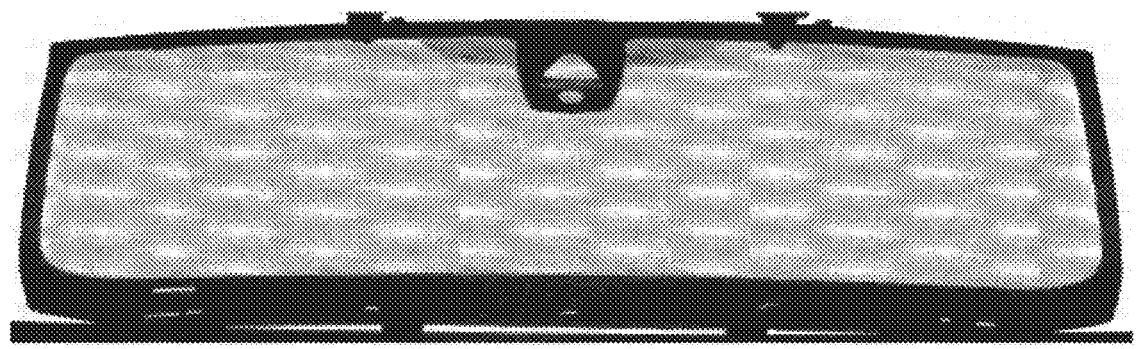
FIG. 6 is a shadow-image of a typical prior art light weight laminated windscreen prepared with inner and outer glass sheets prepared by traditional methods.
Figure 7:
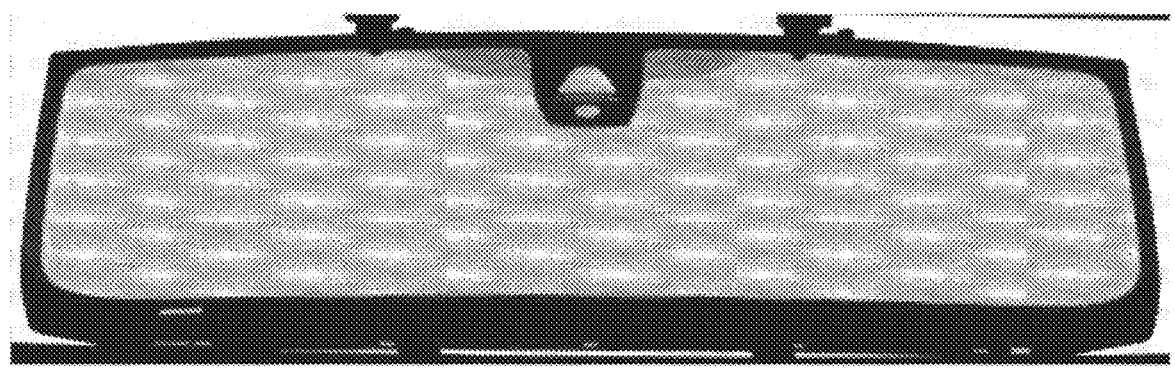
FIG. 7 is a shadow-image of a laminated light weight windscreen prepared according to the method of the present invention.

The improvement in the transmissive optical distortion or cloudiness in a laminated windscreen produced by the method of the present invention is also evident from a visual comparison of the laminated windscreens as depicted in FIG. 6 and FIG. 7.

FIG. 7 is an image of a laminated light weight windscreen prepared in accordance with the present invention in which the outer sheet of glass of the laminate (220) is formed using a press bending process, whilst the inner sheet of glass (260) is formed using an alternative procedure, namely a gravity sag bending process, and the two sheets are laminated according to the method of the present invention.

FIG. 6 is a pictorial representation of a light weight laminated windscreen prepared by known techniques, in which the press bent outer sheet of glass is completely shaped into a desired form by direct, full surface contact with a mould, and the inner sheet of glass is prepared by gravity bending.

It can be seen from FIG. 6 that the windscreen has a mottled appearance, with non-uniform patches of grey shading evident across the windscreen. This grey shading is particularly evident in the inner area of the windscreen. Such rapid changes in the grey coloration of the windscreen, is indicative of rapidly changing optical power within the windscreen, and therefore an increase in the nature and number of undesirable optical effects.

In contrast, from a visual inspection of the laminated windscreen in FIG. 7, it can be seen that the laminated windscreen displays a more uniform coloration, with a lack of mottled grey patches. As a result transmission optics for the windscreen are improved.

To assess the distortion effects of a laminated windscreen produced by the method of the present invention, transmission of light through the windscreen was also measured by an instrument system which is capable of measuring optics for a full windscreen in millidiopters (mdpts).

The instrument system used is capable of measuring optical power. There are a number of instruments on the market which are able to perform this function. These systems operate by projecting light from a single light source through the windscreen glass onto a white screen. A camera then takes a picture of the windscreen (referred to as a "shadow picture") and calculates the optical power of the windscreen in millidiopters.

In the following assessment, only the power which causes deflection and distortion in the vertical direction (that is, the vertical component) was measured. As mentioned previously, the instrument system operates according to agreement ECE R43 standard, or by devices prepared by the company ISRA Vision AG, or in accordance with the appropriate VDA Recommendation, such as VDA 312 Recommendation (March 2015) which relates to 'The requirements to test facilities for inspection of the visual distortion at vehicle panes in transmission'.

The optical power of laminated windscreens prepared according to the present invention was therefore measured using a typical installation angle of 61° from the vertical. The range values for the optical power, measured according to the so-called vision zone A (as described in ECE R43 or VDA 312) are reported.

The optical power of a range of laminated windscreens was recorded and shadow images taken as described above. The results for the assessment are provided in Table 4.

TABLE 4

| Test Number | Laminated windscreen details | Results of visual inspection of shadow images and measurement of optical power in millidiopters (mdpt). |
|---|---|---|
| 1 (Comparative) | A standard windscreen glazing with a 2.1 mm outer sheet and a 2.1 mm inner sheet made by press bending. | The optical power range was 46 millidiopters. The shadow image of the windscreen was homogeneous, with substantially no mottling, indicating acceptable optical appearance and overall substantially no optical issues. |

TABLE 4-continued

| Test Number | Laminated windscreen details | Results of visual inspection of shadow images and measurement of optical power in millidiopters (mdpt). |
|---|---|---|
| 2 (Comparative) | A lightweight windscreen glazing with a first outer sheet of 2.1 mm and a 0.7 mm second inner sheet. The first outer sheet is fully shaped by direct, surface contact with a mould and the second inner sheet of glass is prepared using a different process such as a gravity bending; and laminated under conditions of standard temperature and pressure. (As seen in FIG. 6). | The optical power range was 99 millidiopters, that is, significantly worse than the optical power value for comparative example 1. The shadow image for the windscreen of comparative example 2 was not homogeneous, and showed substantial mottling and optical issues such as rapidly changing optical power. |
| 3 | A lightweight windscreen glazing according to the present invention with a first outer sheet of 2.1 mm thickness and a second inner sheet of 0.7 mm and prepared by method 1 as described above with the first outer sheet of glass initially shaped by press bending and the second inner sheet of glass prepared by gravity bending, followed by lamination in an autoclave at a temperature and pressure of 100 to 130° C. and 10 to 16 bar respectively. | The optical power range was reduced to 68 millidiopters, indicating an improvement in the optical power range compared to comparative example 2. The shadow image of the windscreen was substantially homogeneous, with substantially no mottling. The windscreen demonstrated acceptable optical appearance and minimal optical issues. |
| 4 | A lightweight windscreen glazing according to the present invention with an first outer sheet of 2.1 mm and a 0.7 mm second inner sheet, prepared by method 2 described above with the first outer sheet shaped by press bending and the second inner sheet prepared by gravity bending followed by lamination in an autoclave at a temperature and pressure described above and with a slave mould comprised of a second 2.1 mm press bend glass sheet. (As seen in FIG. 7). | The optical power range was reduced to 62 millidiopters, indicating a further improvement in the optical power range compared to comparative example 2, and approaching the values for a standard windscreen such as comparative example 1. That is, the small wavelength changes in grayscale, indicating changes in optical power are mostly gone, and the optical performance is similar to a standard windscreen. The shadow image of the windscreen was substantially homogeneous, with substantially no mottling and only minor imperfections. |

Therefore it can be seen that in accordance with the method of the present invention it is possible to produce lightweight windscreens with improved visual appearance and optical parameters.

What is claimed:

1. A process for preparing a laminated glazing comprising:
   i) providing a first glass sheet formed into a desired shape with a first thickness by a first procedure;
   ii) providing a second glass sheet formed into a desired shape with a second thickness by a second procedure, wherein the thickness of the first glass sheet is greater than the thickness of the second glass sheet;
   iii) providing an interlayer located between the first and second glass sheet;
   iv) laminating together the first and second glass sheets and the interlayer at a temperature and pressure sufficient to adhere the interlayer material to the glass sheets;
   v) applying a unitary third glass sheet with a thickness the same as the first glass sheet which is shaped substantially the same as the first glass sheet and which is prepared in a same batch process as the first glass sheet, against the second thinner glass sheet, during laminating to adhere the interlayer material to the two glass sheets such that after lamination, the shape of the second glass sheet is substantially the same as the shape of the first glass sheet; and
   vi) providing a foil layer directly between the second glass sheet and the third glass sheet shaped substantially the same as the first glass sheet prior to laminating, wherein the foil layer comprises non-stick film.

2. A process according to claim 1, wherein the thickness of the first glass sheet is in the range 1.4 mm to 2.5 mm.

3. A process according to claim 1, wherein the thickness of the second glass sheet is in the range 0.2 mm to 1.4 mm.

4. A process according to claim 1, wherein in step iv) laminating occurs at a temperature in the range of 90° C. to 132° C. and a pressure in the range 8 to 16 bar.

5. A process according to claim 1, wherein in step iv) laminating occurs at a temperature in the range of 100° C. to 110° C.

6. A process according to claim 1, wherein in step iv) laminating occurs in an autoclave.

7. A process according to claim 1, wherein the interlayer comprises polyvinylbutyral (PVB).

8. A process according to claim 1, wherein the first procedure to form the first glass sheet into the desired shape comprises press-bending.

9. A process according to claim 1, wherein the second procedure to form the second glass sheet into the desired shape comprises gravity sag-bending.

10. A process according to claim 1,
wherein the foil layer comprises a thickness in the range of 0.05 mm to 0.2 mm.

11. A process according to claim 1 wherein the foil layer comprises a non-stick polyester film.

12. A process according to claim 1, wherein the third glass sheet comprises a press bent glass sheet.

13. A process according to claim 1, wherein the first and third glass sheets are prepared in a single press-bending batch process.

14. A process according to claim 1, further comprising:
vii) removing the third glass sheet and the foil layer from the laminated first and second glass sheets.

* * * * *